US006993681B2

(12) United States Patent
Haynes et al.

(10) Patent No.: US 6,993,681 B2
(45) Date of Patent: Jan. 31, 2006

(54) REMOTE ADMINISTRATION IN A DISTRIBUTED SYSTEM

(75) Inventors: Leon E. Haynes, Virginia Beach, VA (US); David N. Johnson, Lolo, MT (US)

(73) Assignee: General Electric Corporation, Schenectady, NY (US)

( * ) Notice: Subject to any disclaimer, the term of this patent is extended or adjusted under 35 U.S.C. 154(b) by 638 days.

(21) Appl. No.: 10/122,133

(22) Filed: Apr. 15, 2002

(65) Prior Publication Data

US 2003/0196136 A1 Oct. 16, 2003

(51) Int. Cl.
*G06F 11/00* (2006.01)
(52) U.S. Cl. ............................................. 714/23; 714/4
(58) Field of Classification Search .................. 714/23, 714/4, 17, 43, 55, 46; 709/224
See application file for complete search history.

(56) References Cited

U.S. PATENT DOCUMENTS

| | | | |
|---|---|---|---|
| 5,491,796 A | | 2/1996 | Wanderer et al. |
| 5,796,951 A | | 8/1998 | Hamner et al. |
| 5,815,652 A | * | 9/1998 | Ote et al. ..................... 714/31 |
| 5,841,981 A | * | 11/1998 | Kondo ........................ 709/223 |
| 5,892,451 A | | 4/1999 | May et al. |
| 6,021,492 A | | 2/2000 | May |
| 6,088,816 A | | 7/2000 | Nouri et al. |
| 6,145,098 A | | 11/2000 | Nouri et al. |
| 6,170,067 B1 | | 1/2001 | Liv et al. |
| 6,205,547 B1 | | 3/2001 | Davis |
| 6,311,276 B1 | | 10/2001 | Connery |
| 6,330,690 B1 | | 12/2001 | Noori et al. |
| 6,332,202 B1 | | 12/2001 | Shelka et al. |
| 6,336,900 B1 | | 1/2002 | Alleckson et al. |
| 6,351,824 B1 | * | 2/2002 | Singh .......................... 714/23 |
| 6,363,421 B2 | | 3/2002 | Barker et al. |
| 6,363,422 B1 | | 3/2002 | Hunter et al. |
| 6,408,261 B1 | | 6/2002 | Durbin |
| 6,651,190 B1 | * | 11/2003 | Worley et al. ................. 714/43 |
| 6,711,616 B1 | * | 3/2004 | Stamm et al. .............. 709/226 |
| 6,742,139 B1 | * | 5/2004 | Forsman et al. .............. 714/23 |
| 6,832,236 B1 | * | 12/2004 | Hamilton et al. ........... 718/100 |
| 6,850,253 B1 | * | 2/2005 | Bazerman et al. .......... 715/734 |
| 2001/0008021 A1 | | 7/2001 | Ote et al. |
| 2001/0047410 A1 | * | 11/2001 | Defosse ...................... 709/224 |

\* cited by examiner

*Primary Examiner*—Scott Baderman
(74) *Attorney, Agent, or Firm*—Hunton & Williams

(57) ABSTRACT

A method and system for remote administration of clients performing critical processes are disclosed herein. A client management module is used to monitor a subset of processes performed by a client. When the client management module detects that a process of the subset has terminated or become inoperable, the client management module can restart the process, as well as notify a remote system manager. Additionally, the client management module is adapted to monitor the consumption of system resources by one or more processes. Using fuzzy logic to evaluate the system resource consumptions of one or more system resource types, the client management module can select an appropriate action response to improve the performance of the process and/or notify an administrator of a status of the process. The remote system manager is adapted to monitor a connection with the client. When a connection failure is detected, the system manager can diagnose a cause of the connection failure and take action accordingly, such as by resetting the client management module, resetting the client, or cycling power to the client using a power distribution unit. Additionally, the remote system manager provides various graphical user interfaces to a user or administrator to allow the administrator to assess the condition of the client and/or remotely control the operation of the one or more processes performed by the client.

41 Claims, 7 Drawing Sheets

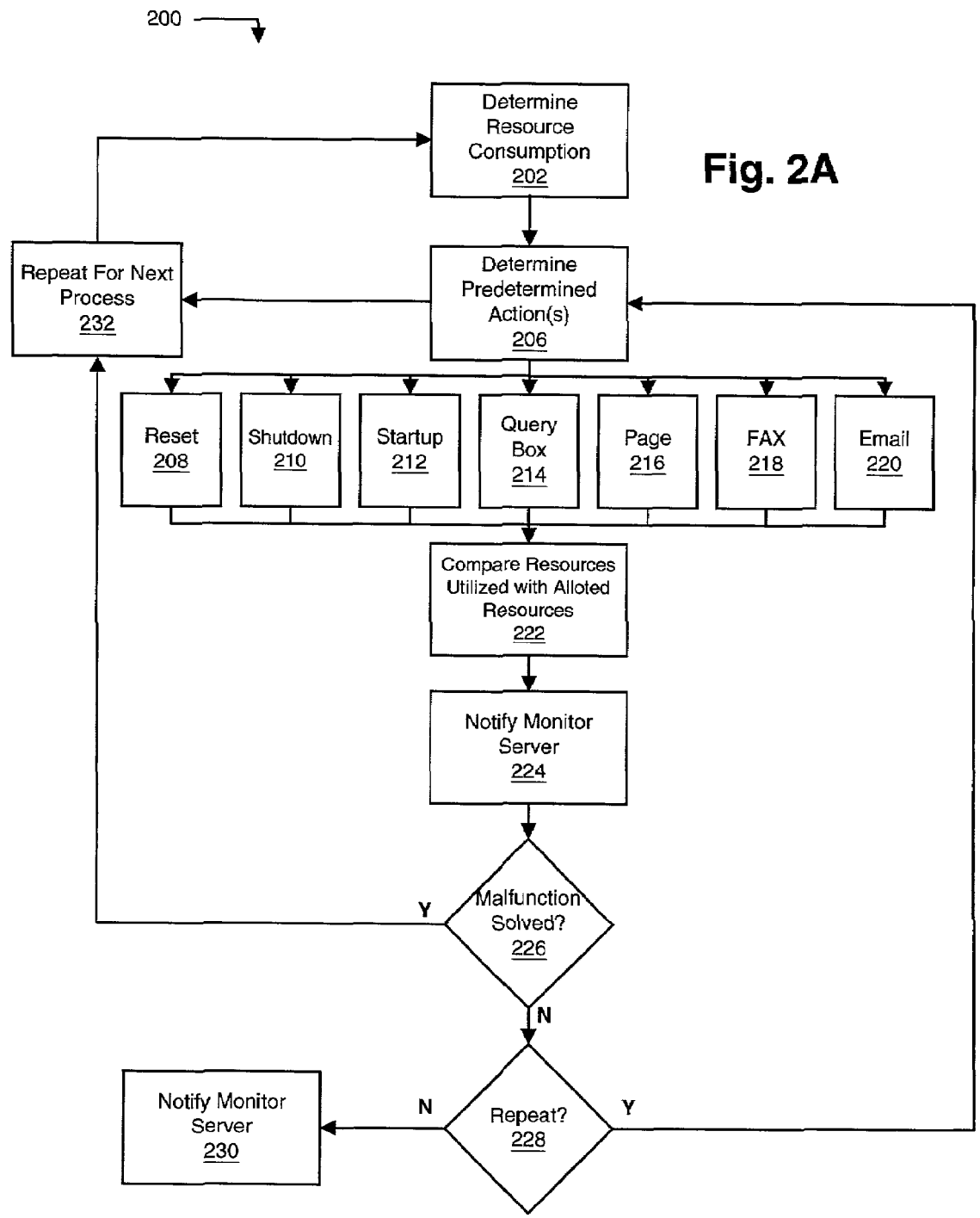

REMOTE ADMINISTRATION IN A DISTRIBUTED SYSTEM

BACKGROUND OF THE INVENTION

The present invention relates generally to distributed systems, and more particularly to remote administration in distributed systems.

Processing devices or systems are widely used for a variety of applications, from controlling complex machinery to providing a communications medium between users. In many instances it is critical that the processes performed by a processing device or system are maintained within acceptable tolerances. For example, due to various circumstances, a process can consume a disproportionate amount of the system resources of the processing device, thereby preventing other processing from operating in a desirable manner. Likewise, processes often can become inoperable, whether by termination by a user or as a result of a malfunction of the process or processing device. The operation of critical systems often results from the excessive consumption of system resources or the termination of a process. For example, processing devices often are used to control the operation of various manufacturing machines in a manufacturing line. If the control program (a process) used to control one of the machines unexpectedly terminates, the machine could malfunction, which is typically costly in repairs and/or lost manufacturing time.

The management of the processes performed by one or more processing devices is further complicated when the processing devices are disbursed over relatively large distances as clients to a central management system. In this case, it often is difficult to effectively and efficiently manage the operation of the clients due to the time and effort necessary to travel between the locations of the processing devices. Accordingly, mechanisms have been developed to allow administrators to remotely view the status of a client, and in limited instances, modify the operation of the client remotely. However, these mechanisms have a number of limitations. For one, the clients typically require feedback from the central management system before their configuration and/or operation can be altered. Should the communications link fail between the central management system and a client or the client becomes inoperable (i.e., freezes up), there usually is no way for the administrator to remotely direct the client to reset or attempt to reconnect. Likewise, the delay introduced while the client is waiting for feedback or direction from the central management system often can hinder the efficient operation of the client in the event that has been determined to exceed its threshold system resource consumption.

Mechanisms therefore have been developed to address the management and control of processes performed by a client by monitoring their system resource consumption. These mechanisms typically compare one or more system resource consumptions by a process to one or more corresponding thresholds. When one or more of these thresholds are exceeded, the monitoring mechanism often performs an action to address the excessive system resource consumption, such as by displaying a query box informing the user of the status of the process or terminating the process. However, the use of use thresholds to detect problematic processes, their implementation is somewhat limited due to the discrete nature of the threshold. For example, assume that a process is allotted a maximum (i.e., a threshold) of five megabytes (MB) of virtual memory. In this case, any degradation in the performance of the process generally would only be detected once the process consumes more than five MB of virtual memory. If the process consumed only 4.9 MB of virtual memory, it could be assumed that the performance of the process is, or will be shortly, degraded to some extent. However, since the consumption of 4.9 MB of virtual memory does not exceed the threshold, no indication typically is made that the performance of the process is degraded or that degraded performance is imminent.

Accordingly, an improved system and method for remotely managing clients performing critical processes would be advantageous. Specifically, a method and system for managing processes at a client using a more accurate determination of the status of processes is needed.

SUMMARY OF THE INVENTION

The disclosed technique mitigates or solves the above-identified limitation in known implementations, as well as other unspecified deficiencies in the known implementations.

In a distributed system having at least one system manager in bi-directional communication with at least one client performing a plurality of processes, a method for monitoring a subset of the plurality of processes is provided in accordance with one embodiment of the present invention. The method comprises the steps of detecting a loss of supervisory control by the system manager over the processes at the client, including determining a status of a first process of the subset, attempting by the client to restart the first process in the event the status indicates the first process is inoperative, and resetting the client by cycling power thereto in the event the status of the first process is operative.

In a distributed system having at least one system manager in bi-directional communication with at least one client performing a plurality of processes, a method for monitoring a subset of a plurality of processes at the client is provided in accordance with another embodiment of the present invention. The method comprises the steps of determining at least one system resource consumption by a first process of the subset and performing a fuzzy logic evaluation of the at least one system resource consumption to determine a first action response to be performed by the client in response to the system resource consumption by the first process, the first action response including at least one action. The method further comprises performing, at the client, the at least one action of the first action response.

In a distributed system having a system manager in bi-directional communication with at least one client, a method for monitoring a communications link between the system manager and a client is provided in accordance with yet another embodiment of the present invention. The method comprises the steps of detecting a failure in the communications link between the system manager and the client management module, determining an operative status of a client management module at the client, directing the client to restart the client management module when the operative status indicates the client management module is inoperative, resetting the client when the status indicates the client management module is operative.

In a distributed system having a system manager in bi-directional communication with at least one client receiving power from a power distribution unit, a method for monitoring and establishing a communications link between the system manager and a client is provided in accordance with yet another embodiment of the present invention. The method comprises the steps of detecting a failure in the communications link between the system manager and the client, wherein the step of detecting the failure includes transmitting a heartbeat signal from the system manager to the client, and waiting, at the system manager, for a response to the heartbeat signal from the client, and wherein a failure in the communications link is assumed when the response does not arrive at the system manager within a predetermined time period. The method further comprises restarting the client by the system manager directing the power distribution unit to cycle power to the client.

In a distributed system having a system manager in bi-directional communication with at least one client having a client management module to monitor at least one process performed by the client, a graphical user interface is provided in accordance with an additional embodiment of the present invention. The graphical user interface comprises a client status field having a user-selectable client entry for each of the at least one clients, each client status field including a client identifier field representing a client associated with the client entry and a status field representing a connection status of the associated client to the system manager. The graphical user interface further comprises a client properties object adapted to direct the client to present a display representative of at least one property of the associated client when selected by a user.

In a distributed system having a system manager in bi-directional communication with at least one client having a client management module to monitor at least one process performed by the client, a graphical user interface for displaying at least one property of the client management module process at the system manager is provided in accordance with yet another embodiment of the present invention. The graphical user interface comprises a process status field having a user-selectable process entry for each of the at least one process, each process status field including a process identifier field representing an associated process, a status field representing an operative status of the associated process, and at least one resource consumption field representing a consumption by the associated process of an associated system resource. The graphical user interface further comprises a process operation object adapted to direct, when selected by a user, the client to restart a process associated with a process status field selected by the user when the associated process is inoperative and to stop the associated process when the associated process is operative and at least one client action object adapted to direct, when selected by a user, the client to perform an associated action.

In a distributed system having a system manager in bi-directional communication with at least one client having a client management module to monitor at least one process performed by the client, a graphical user interface for managing at least one property of the client management module at the system manager is provided in accordance with one embodiment of the present invention, the graphical user interface comprises a fuzzy logic field being adapted to receive input from a user, the input being representative of a desired change in at least one parameter of a fuzzy logic evaluation used by the client management module to manage one or more processes of the client and a modify object adapted to direct the system manager to transmit a signal representative of the desired change to the client management module for implementation at the client management module.

In accordance with yet another embodiment of the present invention a system is provided. The system comprises a first client being adapted to perform a plurality of processes, the first client including a client management module adapted to determine at least one system resource consumption by a first process of plurality of processes, perform a fuzzy logic evaluation of the at least one system resource consumption to determine a first action response to be performed by the first client in response to the system resource consumption by the first process, the first action response including at least one action, and perform the at least one action of the first action response. The system further comprises a system manager in communication with the first client and being adapted to direct the first client to modify at least one parameter of the fuzzy logic evaluation used by the first client.

In accordance with yet another embodiment of the present invention, a computer readable medium is provided. The computer readable medium including executable instructions being adapted to manipulate a processor to determine at least one system resource consumption by a first process of a subset of processes performed by a client, perform a fuzzy logic evaluation of the at least one system resource consumption to determine a first action response to be performed by the client in response to the system resource consumption by the first process, the first action response including at least one action, and perform the at least one action of the first action response.

One advantage of the present invention is a more accurate management of processes performed by a client. Another advantage of the present invention is an improved efficiency of the client. An additional advantage of the present invention is more reliable remote management of a client performing critical processes.

Still further objects and features of the present invention are identified in the ensuing description, with reference to the drawings identified below.

BRIEF DESCRIPTION OF THE DRAWINGS

The purposes and advantages of the present invention will be apparent to those of ordinary skill in the art from the following detailed description in conjunction with the appended drawings in which like reference characters are used to indicate like elements, and in which:

FIGS. 2A and 2B are flow diagrams illustrating an exemplary algorithm for determining an action response to the consumption of resources by a process using fuzzy logic in accordance with at least one embodiment of the present invention;

DETAILED DESCRIPTION OF THE PREFERRED EMBODIMENTS

As used herein, any term in the singular may be interpreted to be in the plural, and alternatively, any term in the plural may be interpreted to be in the singular.

One aspect of the present invention employs the use of fuzzy logic, the principals of which are widely known and have been the subject of countless articles, including those of the founder of fuzzy logic or fuzzy set theory, Lotfi Zadeh. As provided by Pacific Northwest National Laboratory, fuzzy logic involves using approximate information to mathematically represent uncertainty and vagueness to generate decisions. Fuzzy logic enables designers to handle the imprecision intrinsic to many problems. In general, fuzzy logic groups data into classes using boundaries that are not sharply defined (i.e., fuzzy). Theories implementing "crisp" definitions such as classical set theory, arithmetic, and programming, may be "fuzzified" by generalizing "crisp" data into a fuzzy set having blurred boundaries. Linguistic variables are used in some fuzzy logic applications, wherein broad overarching terms such a "large," "medium," and "small" define the classes of data and capture a range of numerical values. In fuzzy logic, these classes are permitted to overlap, i.e., some data or members may be included in more than one class and may be further characterized in that their degree of membership with any given class may vary according to one or more related factors. Fuzzy set theory encompasses fuzzy logic, fuzzy arithmetic, fuzzy mathematical programming, fuzzy topology, fuzzy graph theory, fuzzy data analysis, and fuzzy evaluation, though the term fuzzy logic is often used to describe all of these and is used in this fashion herein. Fuzzy logic uses the linguistic variables on a continuous range of truth values to allow intermediate values to be defined between conventional binary. A more detailed explanation is provided by a number of articles, including one source for the above explanation, Pacific Northwest National Laboratory, Battelle Memorial Institute, 1997.

Figure 1:
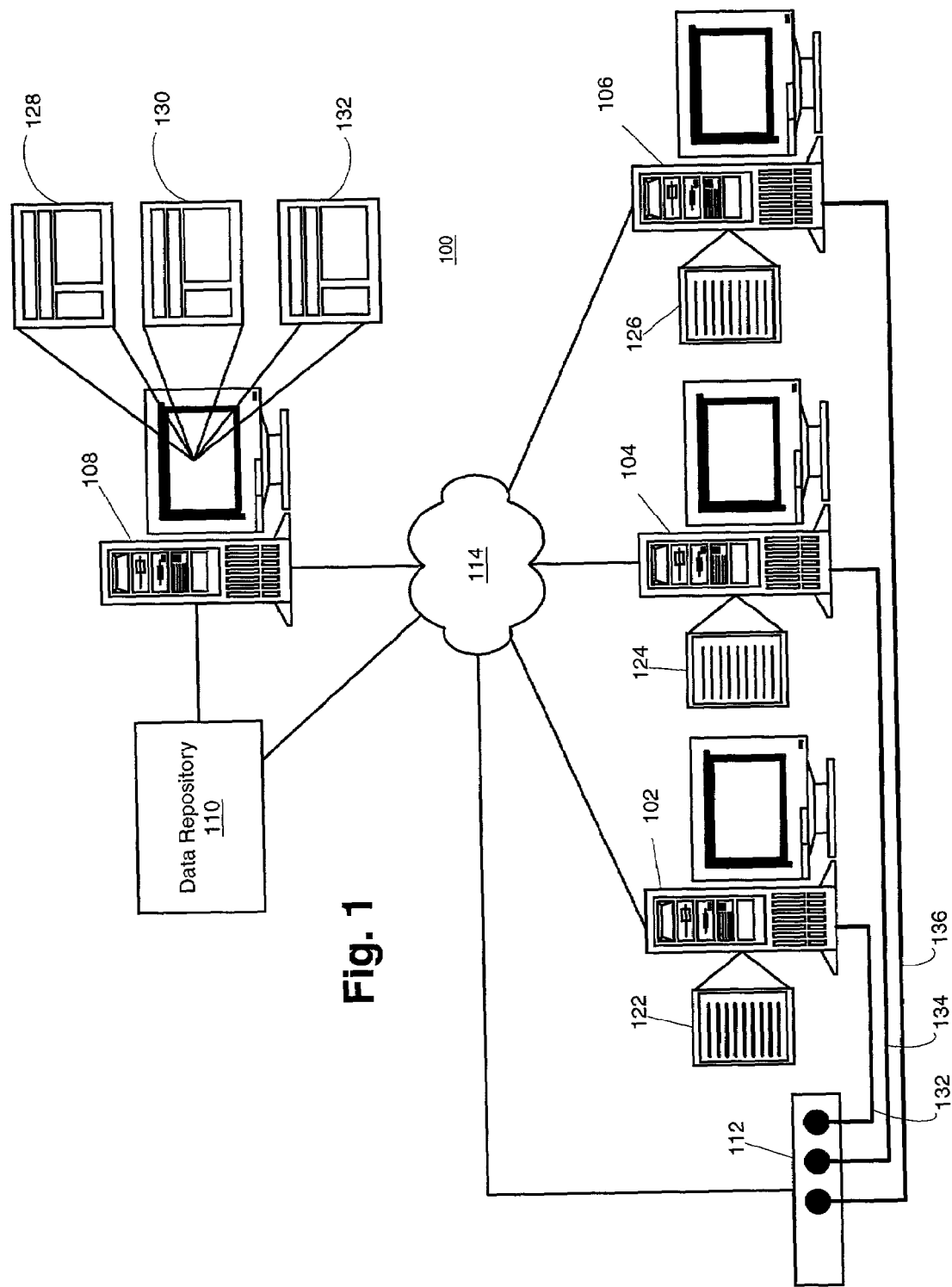
FIG. 1 is a schematic diagram illustrating an exemplary implementation of a remote administration system in accordance with at least one embodiment of the present invention.

Referring now to FIG. 1, an exemplary implementation of a remote administration system 100 is illustrated in accordance with at least one embodiment of the present invention. System 100 includes a system manager 108 in bi-directional communication with one or more clients 102–106 via a network 114. The system manager 108 and the clients 102–106 can be implemented as any of a variety of processing devices, or a combination thereof, such as personal computer, a desktop computer, a server, a handheld computing device, a programmable logic controller, and the like. For example, the system manager 108 and the clients 102–106 each can include a personal computer using the Windows NT operating system available from Microsoft Corporation of Redmond, Wash. In one embodiment, the system manager 108 includes a processing device dedicated to the administration/management of the system 100. Alternatively, the system manager 108 can be elected from one of the clients of the system 100 to perform overall system administration/management for the system 100. The network 114 can include any of a variety of networks or data transfer mediums, or a combination thereof, such as a local area network, a wide area network, a private network, the Internet, a wireless network, a bus, a serial connection, and the like.

In at least one embodiment, each of clients 102–106 performs (i.e., "executes") one or more processes managed by a client management module 122–126, respectively, adapted to monitor the operation of a subset of the processes performed by the associated client. The term "process," as used herein, refers to any of a variety of executable tasks capable of being performed by a client. Processes also are commonly referred to as "applications," "programs," "executables," "drivers," "services," and the like. For example, the client 102 could be adapted to execute a word processing program, an Internet browser, and the like. Additionally, a client could be implemented to control the operation of another device. For example, the system 100 could be implemented in a manufacturing process, where each of clients 102–106 is adapted to manage and control the operation of a separate machine used in the manufacturing process. In such an application, the client may take the form of a programmable logic controller (PLC) and may be connected to a supervisory control and data requisition (SCADA) system. Local user interface/access feedback may be accomplished in a variety of known ways.

Accordingly, the client management module of a client, in one embodiment, is adapted to manage the operation of the selected subset of processes. In the event that one of the managed processes is unexpectedly stopped by the user, the client management module can be adapted to detect the termination of the process and notify the user of the unexpected termination of the process using, for example, a graphical user query box displayed on a monitor of the client. The user can then elect to restart the terminated process or direct the client management module to disregard, temporarily or permanently, the termination of the process.

Additionally, in at least one embodiment, the client management module is adapted to monitor the system resource consumption(s) of each of the processes monitored by the client management module. Based at least in part on an evaluation of the one or more system resource consumptions of a process, the client management module can be adapted to perform one or more actions in response in an attempt to correct the undesirable operation of the process or to notify an administrator of a potential problem, such as for preemptive supervisory control. The system resource consumption of a process monitored by a client management module can include either a value of the consumed resources, or alternately a value representative of the rate-of-change in the consumption of the system resources. To illustrate, while the amount of system resources consumed may have direct bearing on the performance of the process and/or the client, it will be appreciated that this value can vary widely under normal circumstances. Accordingly, in many instances, the rate-of-change may be a better indicator of a current or potential problem with the operation of a process.

For example, if a process has been operating continuously for a considerable time period, the process often may have a considerable cumulative number of page faults resulting from a normal operation of the process. As such, it may be difficult to determine when the number of page faults indicates a potential problem. However, if the rate of the occurrence of page faults increases dramatically, it typically indicates that there is a potential problem with the operation of the corresponding process. Accordingly, monitoring the rate-of-change of the page faults would, in this case, be a more accurate gauge of the status of the process. Additionally, the client management module may look to other definable operation characteristics to trigger some action(s).

The system resources of monitored by the client management module can include but are not limited to: central processing unit (CPU) usage; memory usage; change in memory usage; peak memory usage; virtual memory size; the number of page faults; the change in the number of page faults; the paged pool; the non-paged pool; the handle count; the thread count; user objects; graphical display interface object count; input/output (I/O) reads; I/O read bytes; I/O write count; I/O write bytes; and the like. The actions can include but are not limited to: resetting the client; shutting down the process; starting the process; terminating the process; displaying a query box for observation by an administrator/user; sending a page to an administrator's pager; sending a facsimile to a fax machine; sending an email to the administrator; sending a voice message to a mobile phone number, and the like.

The client management module, in one embodiment, can be adapted to perform one or more actions in a certain sequence and/or for up to a maximum number of iterations. For example, if the client management module determines that the rate-of-change in the CPU usage of a process is abnormal, the client management module can shutdown and restart the process. If the client management module detects that the process continues to abnormally consume CPU cycles, the client management module can be adapted to attempt to shutdown and restart the process again. This sequence of shutting down and restarting the process can be repeated until the process begins to behave within the threshold up to a certain number of iterations. If the process continues to consume excessive resources after the last of the allowed iterations, the client management module can be adapted to notify the administrator by, for example, page or email, that the process on the associated client is suffering from faulty or improper operation. The actions performed by a client in response to an evaluation of the status of a process, their sequence, and/or the number of iterations is collectively referred to as the "action response" of the client to the potential malfunction of the process.

In one embodiment, the client management module monitors the system resource consumption of a process by comparing the determined consumption with one or more threshold values. When one or more of the threshold values is exceeded, the client management module may determine an appropriate action response based on the threshold exceeded. The term "exceeds," as used herein to define the actual, detected, or perceived system resource consumption of a process with reference to a threshold, refers to the system resource consumption being greater than a predetermined or dynamically-calculated threshold representative of a maximum system resource consumption threshold or being less than a threshold representative of a minimum system resource consumption threshold. For example, if a maximum CPU usage threshold is set to 80% and the CPU usage of a process is determined to be 90%, the system resource consumption (CPU usage) of the process exceeds the maximum threshold. Conversely, if a minimum CPU threshold is set to 5% and the CPU usage of a process is determined to be 2%, the system consumption resource (CPU usage) is determined exceed the minimum threshold. That is, a system resource consumption exceeds a threshold when it goes above an upper bound or falls below a lower bound or falls outside a designated or determined range.

However, it will be appreciated that in many cases, the use of thresholds typically does not provide a desirable degree of accuracy in the determination of the operative status of a process. For example, if the client management module is adapted to measure the rate-of-change in memory usage (memory usage delta) and the predetermined threshold is set at a rate-of-change of 5 MB/millisecond, a rate-of-change of 4.99 MB/millisecond generally would not trigger the client management module to take action, even though the rate-of-change of 4.99 MB/ms could indicate a serious malfunction in the operation of the process.

Accordingly, in at least one embodiment, the client management module is adapted to utilize fuzzy logic to analyze one or more system resource consumptions of a process, and determine an appropriate action response based at least in part on the analysis. For example, the client management module could generate three fuzzy set ranges: "low"; "medium"; and "high"; for each type of system resource consumption monitored for a process. Based at least in part on a fuzzy logic evaluation of the system resource consumption(s) of a process using these fuzzy set ranges, the client management module can determine an action response value representative of an action response appropriate to the status of the process. By using fuzzy logic to evaluate the system resource consumption(s) of a process, a more accurate evaluation of the status of the process typically can be determined than with the use of one or more discrete thresholds. An exemplary operation of the client management module is illustrated with reference to FIGS. 2A and 2B.

In addition to monitoring a subset of the processes performed by each client 102–106 using a client management module 122–126, respectively, at each of the clients, the system manager 108, in one embodiment, is adapted to monitor an overall operation of the clients 102–106 with relation to the system 100. To this end, the system manager 108 can be adapted to monitor the communications between the system manager 108 and the clients 102–106. In the event that the system manager 108 detects a communication failure between itself and one or more of the clients 102–106, the system manager 108 can be adapted to perform one or more diagnostic/troubleshooting procedures. The system manager 108 can detect a communications failure in a number of ways. In one embodiment, the system manager 108 is adapted to periodically transmit a "heartbeat" to each of clients 102–106. Each client, upon receipt of the heartbeat, responds in kind. The heartbeat can include any of a variety of signals that can be transmitted between the system manager 108 and a client to which the client can reply. For example, the system manager 108 could be in communication with the clients 102–106 over an Internet Protocol (IP)-based network (network 114). In this case, the system manager 108 could attempt to contact a non-responsive client using, for example, the ping utility whereby a ping packet (the heartbeat) is sent to the network address of the client and if the client receives the ping packet, it replies by sending a ping packet back to the system manager 108. If the system manager 108 does not receive a reply from a client in response to the ping packet within a certain time period, the system manager 108 can assume that status of the communications link between the system manager 108 and the client is no longer valid.

Alternatively, the system 100 can include a separate processing component, such as a data repository 110, in communication with one or more of the clients 102–106 via the network 114. In the illustrated embodiment, the data repository 110, which can include, for example, a data server or a file backup system, receives real-time data resulting from the operation of one or more processes performed by the clients 102–106. In the event that the data flow from one or more of the clients 102–106 to the data repository 110 ceases, the data repository 110 can provide a signal to the system manager 108 indicating a potential problem with clients. Based on the information provided from the data repository 110, the system manager 108 can attempt to determine the source of the problem and attempt to solve it.

There are at least three potential sources of a communications failure between the system manager 108 and a non-responsive client. The first source includes the communications link (i.e., the network 114) between the system manager 108 and the non-responsive client. To determine if this is the source, in whole or part, of the communications failure, the system manager 108 can be adapted to determine the status of the communications link using a connection verification tool such as the ping utility. If the system manager 108 determines that the communications link is invalid, the system manager 108 can, for example, reset the non-responsive client in an attempt to reconnect the client, after being reset, to the network 114.

To illustrate, in at least one embodiment, the system 100 includes at least one power distribution unit (PDU) 112 adapted to provide power or control the power fed to some or all of the clients 102–106. In the illustrated embodiment, a single PDU 112 is used to provide power to all of the clients 102–106. However, in other implementations, a number of PDUs 112 can be used, each to provide power to a subset of the clients 102–106. In at least one embodiment, the PDU 112 is adapted to cycle (i.e., turn off and then turn back on) power through one or more of its outlets based on a signal received from the system manager 108, either via the network 114 or another connection. An example of such a PDU is available under the designation MasterSwitch Plus™ from American Power Conversion Corporation of West Kingston, R.I. When the system manager 108 is unable to contact the unresponsive client, either because the communications link is down or because the operating system of the client is un-responsive, the system manager 108 can direct the PDU 112 to cycle power to the client, thereby causing the client to reset.

The second potential source of the non-responsive client arises when the operating system of the client is inoperative (i.e., "frozen"). Therefore, when a heartbeat (e.g., a ping packet) is transmitted by the system manager 108 for reception by the client, the communications link to the client may be valid (i.e., a functioning connection exists) but the inoperative operating system of the client is unable to provide a response to the heartbeat. In this case, the system manager 108 can approach the problem in the same manner that an invalid communications link may be corrected by directing the PDU 112 to cycle power to the non-responsive client to reset the client and the operation of the operating system.

The third potential source of the problem may be that the client management module of the client is inoperative and therefore is unable to transmit information to the system manager 108. The system manager 108, in one embodiment, can determine the operative status of a client management module of a client by, for example, transmitting a heartbeat. If a response is received from the client, it can be assumed that both the communications link and the operating system of the client are operative. Therefore the communications failure likely is a result of an inoperative client management module. Accordingly, the system manager 108 can attempt to correct the communications failure by directing the client to reset its client management module without resetting the client itself.

In addition to, or instead of, providing communications control between the system manager 108 and the clients 102–106, the system manager 108, in one embodiment, is adapted to allow an administrator or other user to remotely manage the processes of the clients 102–106 from the system manager 108 using the client management module of each client. In one embodiment, the system manager 108 is adapted to generate and display a graphical user interface (GUI) 128 used, among other things, to identify the status (e.g., connected or disconnected) of each of the clients 102–106. The administrator or other user can also use the GUI 128 to manage the operation of the clients 102–106, such as by manually selecting some of clients 102–106 for shutdown, restart, cycling of power using the PDU 112, and the like. An exemplary implementation of the GUI 128 is illustrated in greater detail with reference to FIG. 4. Additionally, in at least one embodiment, the system manager 108 is adapted to generate and display a GUI 130 to display one or more properties of a selected client. The GUI 130 can be activated from the GUI 128, such as by selecting the desired client, or via another activation mechanism. An exemplary implementation of the GUI 130 is illustrated with reference to FIG. 5.

Figure 6:
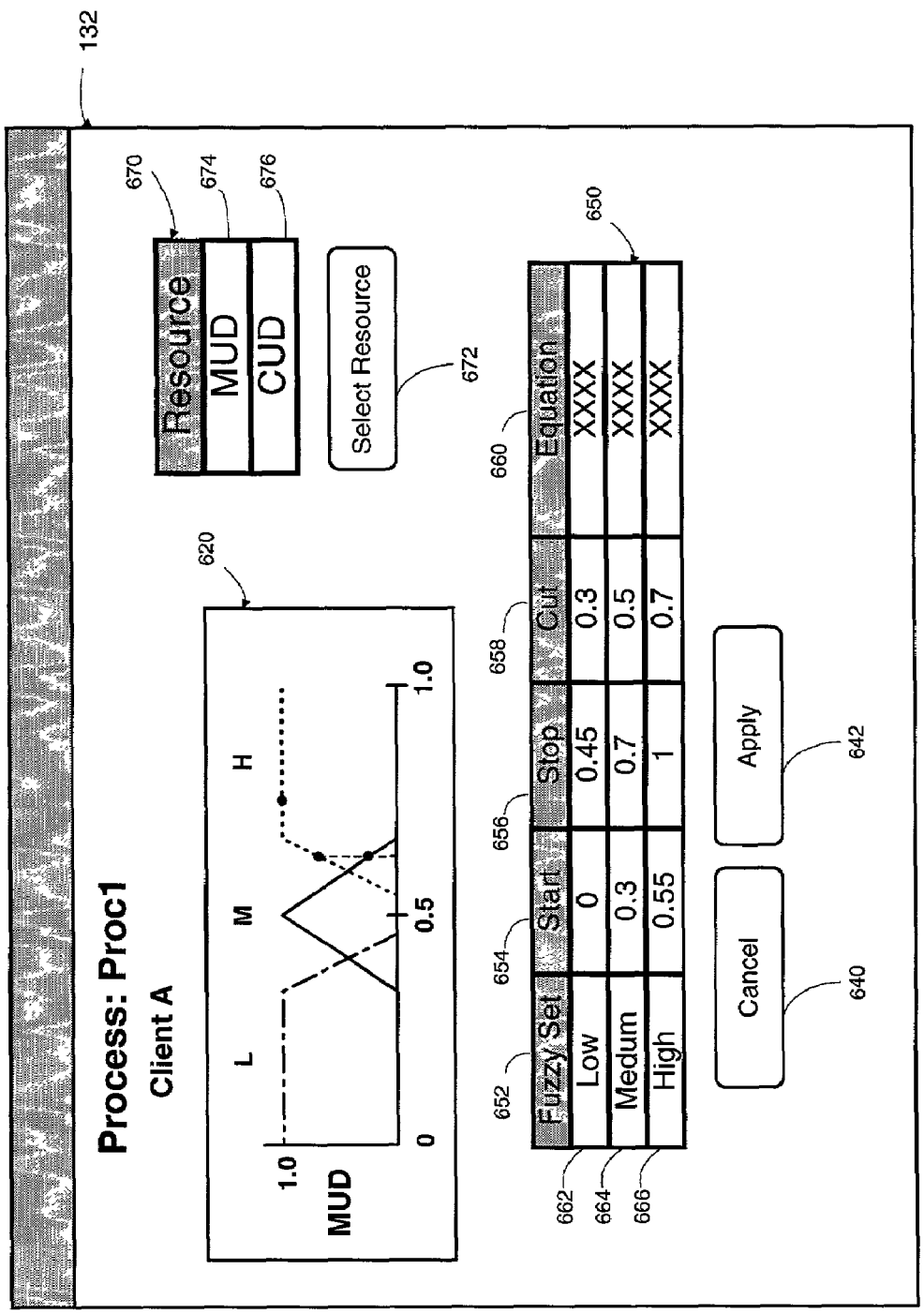
FIG. 6 is a block diagram illustrating an exemplary implementation of a graphical user interface for modification of at least one fuzzy logic parameter used by a client to monitor a status of a process at the client.

As noted above, in at least one embodiment, the client management module is adapted to monitor a process by using fuzzy logic to evaluate one or more system resource consumptions of the process. In this case, the system manager 108 can be adapted remotely modify one or more parameters used by the client management module to perform such a fuzzy logic evaluation. To illustrate, the system manager 108, in one embodiment, is adapted to display a GUI 132 for use by the user to enter and modify fuzzy logic parameters associated with the evaluation of one or more processes. For example, each process can have two or more associated fuzzy logic sets, such as: low and high; low, medium low, medium, medium high, and high; or low, medium, and high. Using the GUI 132, a user or administrator can modify the properties of each of these fuzzy logic sets. FIG. 6 illustrates an exemplary implementation of the GUI 132 in greater detail.

Figure 2B:
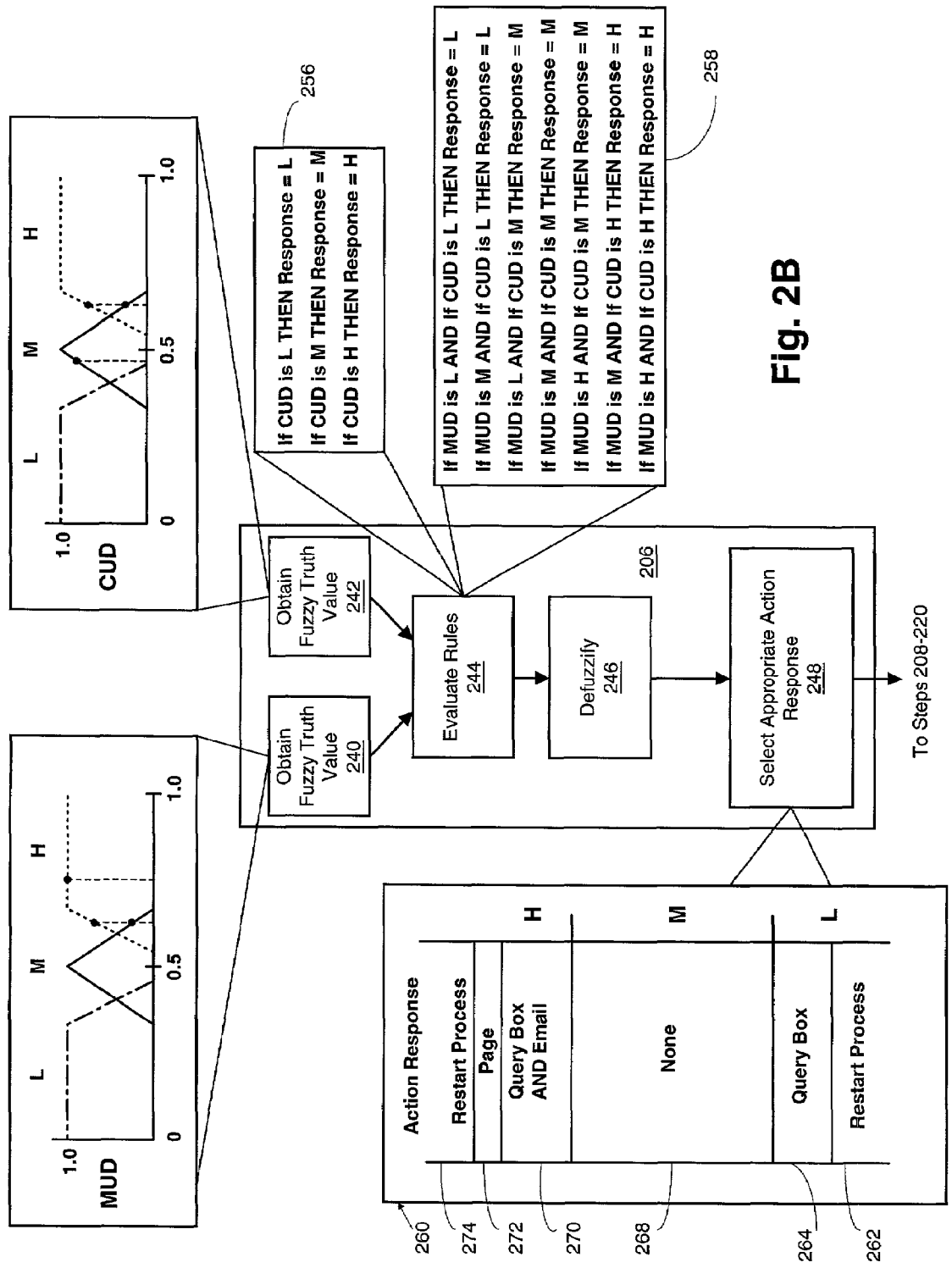

Referring now to FIGS. 2A and 2B, an exemplary algorithm for using a client management module (for example, client management module 122 of FIG. 1) to monitor and manage one or more processes performed by a client (such as client 102 of FIG. 1). The illustrated client management algorithm 200 initiates at step 202 wherein the client management module determines one or more system resource consumption(s) by a first process of a subset of processes monitored by the client management module. Any number of mechanisms known to those skilled in the art may be used to measure the system resource consumption of a process. For example, in many cases, operating systems maintain statistics on the system resource consumption of the processes performed using the operating system. Accordingly, the client management module can query the operating system of the client to determine a particular system resource consumption of the process. Alternatively, the client management module can maintain these types of statistics independently from the operating system.

In step 206, the client management module determines an action response for the client management module based on the one or more system resource consumptions determined at step 202. As noted above, in one embodiment, the client management module determines an appropriate action plan by comparing the system resource consumption(s) to their corresponding threshold(s). If the threshold(s) are not exceeded, the algorithm 200 continues to step 232, whereupon the next process of the subset of processes monitored by the client management module is selected and the algorithm 200 is repeated starting at step 202 with the next selected process.

However, also as noted above, in another embodiment, the client management module evaluates the status of a process by evaluating the one or more system resource consumptions using fuzzy logic. FIG. 2B illustrates an exemplary implementation of such a fuzzy logic evaluation. In the illustrated embodiment, the client management module can evaluate one or more of the system resource consumptions of a process, such as the rate-of-change in the memory usage (memory usage delta or MUD) and/or the rate-of-change in the CPU usage (CPU usage delta or CUD). As such, a fuzzy logic set is generated for each monitored system resource consumption, such as fuzzy logic set 252 for MUD and fuzzy logic set 254 for CUD. As illustrated, fuzzy logic set 252 includes a low (L) subset (illustrated as line 278), a medium (M) subset (illustrated as line 280), and a high (H) subset (illustrated as line 282). The fuzzy logic set 254 also includes a low (L) subset (illustrated as line 278), a medium (M) subset (illustrated as line 280), and a high (H) subset (illustrated as line 282).

At substep 240 of step 206, the client management module obtains the fuzzy truth value for the MUD value of the first process by evaluating the MUD value in the context of the fuzzy set 252. For example, if the MUD value (i.e., the rate-of-change in the memory usage) is value A, then the fuzzy truth value is based on the inclusion of the value A in both the medium fuzzy subset ($A_M$) and the high fuzzy subset ($A_H$). Alternatively, the fuzzy truth value for a MUD value B is determined solely from the high fuzzy subset ($B_H$).

In the event that more than one system resource consumption is considered, the client management module can obtain the fuzzy truth value associated with, for example, the rate-of-change in the CPU usage (CUD) by the first process at substep 242. If the CUD value is C, for example, the fuzzy subset 284 ($C_L$) is used to evaluate the fuzzy truth value of C. On the other hand, if the CUD value is D, then the fuzzy truth value for the CUD parameter is based on the inclusion of D in both the medium fuzzy subset ($D_M$) and the high fuzzy subset ($D_H$).

In the event that a single system resource consumption value is used to evaluate the status of the first process, a fuzzy evaluation of the resulting fuzzy truth value is performed using fuzzy logic rules 256 directed to a single fuzzy truth value at substep 244. Alternatively, in the event that multiple system resource consumption values are used to determine the status, the fuzzy logic evaluation performed at substep 244 utilizes fuzzy logic rules 258 directed to multiple fuzzy truth values corresponding to multiple system resource consumption values. The fuzzy logic rule(s) are evaluated using the fuzzy logic truth(s) obtained at substeps 240 and/or 242 to generate a fuzzy logic solution. It will be appreciated by those skilled in the art that a defuzzifying process, such as a centroid calculation, is performed on a fuzzy logic solution to convert the fuzzy set represented by the fuzzy logic solution to a discrete value (i.e., a "crisp" value) that can be used for evaluative purposes. Accordingly, at substep 246, a defuzzifying process is performed on the fuzzy logic solution to obtain an action response value representative of an appropriate action response. Any defuzzifying process known to those skilled in the art may be implemented without departing from the spirit or the scope of the present invention.

At substep 248, the client management module uses the action response value to select the appropriate action response. In one embodiment, the client management module maintains a scale 260 having a number of ranges 262–274, each corresponding to a specific action response. Accordingly, the selected action response for implementation by the client corresponds to the range 262–274 that includes the action response value.

To illustrate, assume that the MUD value is extremely low and the CUD value is extremely low indicating, in this case, that the process may be stalled. As a result of the fuzzy logic evaluation and defuzzification, a very low action response value results, which falls in the range 262. Since the range 262 corresponds to the action response of restarting the process, the client management module can restart the process since it is likely that the process stalled. Conversely, assume that the MUD value is extremely high and the CUD value also extremely high. Such an occurrence may indicate that the process is malfunctioning. In this example, the resulting action response value falls into, for example, the range 274 that corresponds to the action of restarting the process. Accordingly, the client may implement this action plan to restart the process. Furthermore, assume that both the CUD and the MUD values fall into the middle fuzzy subsets. In this case, an action response value in the range 268 typically will result, requiring no action by the client management module.

As the resulting action response value increases, in one embodiment, so does the invasiveness of the resulting action response. Accordingly, the fuzzy logic evaluation may be used to selectively and progressively respond to a change in the status of a process as indicated by its system resource consumptions. In contrast, the use of thresholds result in a selection of an action response that is not optimal for the actual status of the process.

Referring back to FIG. 2A, after selecting the action response, the client management module performs the one or more actions of the action response in the selected sequence for the determined number of iterations. Actions performed by the client management module can include resetting the client at step 208. For example, if a process has rendered the operating system of the client inoperable, it may be desirable to reset the client. An action also can include shutting down the process at step 210 or starting up the process at step 212. For example, if the CPU usage of a process exceeds (or meets) a minimum threshold (i.e., the CPU usage is equivalent to 0%), it could be that the process has been terminated. Accordingly, the client management module can be adapted to restart the terminated process at step 212. Another action can include displaying a query box at step 214 to inform a user of the excessive system consumption of the process. A page, fax, or email can be sent as an action performed by the client management module at steps 216, 218, and 220, respectively.

Additionally, the actions can be performed in a sequence by the client management module as specified by the selected action response. For example, the client could be reset at step 208 and then an email sent to the administrator at step 220 to notify the administrator of the restart of the client. Likewise, the action response can include iterations of one or more steps. For example, the process can be restarted again and again until the system resource consumptions of the process fall within acceptable bounds. However, if the process continues to consume excessive system resources after a certain number of iterations, the process can be shut down at step 210 and a page sent at step 218.

After the performance of each action in the action response, the system resource consumption of the process after the action is performed can be evaluated (i.e., by a fuzzy logic evaluation or by comparison to one or more threshold) at step 222 and the client management module can be adapted to provide a notice of the action performed and/or the results to the system manager 108 at step 224. The notice can be implemented in any of a variety of forms, such as a data structure sent as part of an IP packet, known to those skilled in the art. In the event that the system resource consumption(s) of the process are within acceptable bounds (step 226), the algorithm 200 continues to step 232, whereupon the next process controlled by the client management module is selected and the algorithm 200 is performed on the next process starting at step 202.

However, if the process continues to exhibit undesired performance characteristics (step 226), the algorithm 200 determines at step 228 the next action to perform from the action response. If another action is to be performed, the algorithm 200 continues back to step 206 where the next action is selected and then performed. If there are no more actions to be performed in the action response and the performance of the process is still degraded or is still likely to degrade, the client management module, in one embodiment, notifies the system manager 108 (FIG. 1) of its unsuccessful attempt at maintaining the client at step 230. Additionally, the client management module can direct the client to shut down the process or shut down completely.

Figure 3:
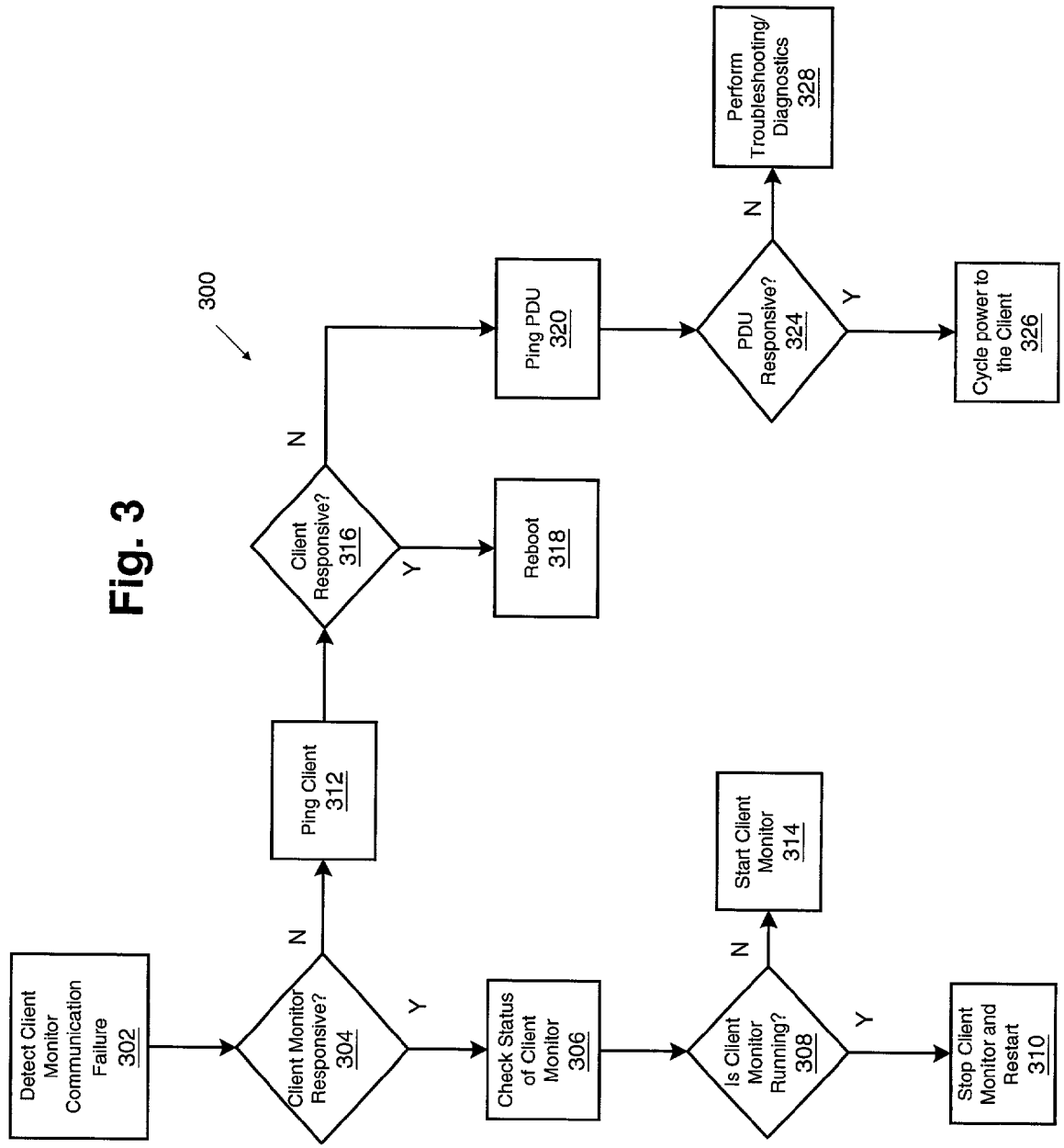
FIG. 3 is a flow diagram illustrating an exemplary algorithm for remote administration of a client in accordance with at least one embodiment of the present invention.

Referring now to FIG. 3, an exemplary algorithm 300 to monitor the clients 102–106 (FIG. 1) from the system manager 108 (FIG. 1) is illustrated in at least one embodiment of the present invention. The algorithm 300 initiates with step 302, whereupon a communications failure is detected between a client and the system manager 108. As noted previously, the communications failure can be detected based on a heartbeat transmitted by the system manager 108 to the client or from a signal provided by an external component intended to be in communication with the client or from some other known means for directing.

At step 304, the system manager 108 attempts to contact the client management module of the client, for example, by transmitting a heartbeat to the client management module and waiting for a response. If the client management module responds, the system manager 108 determines the operating status of the client management module (client management modules 122–126, FIG. 1) at step 308 by querying, for example, the operating system of the client. If the operating status of the client management module indicates the client management module is operable, the system manager 108 directs the client to terminate the client management module and then restart the client management module in an attempt to correct the malfunctioning client management module. If the operating status of the client management module indicates the client management module is inoperable or not currently being executed by the client, the system manager 108 directs the client to start the client management module at step 314.

In the event that the client management module is deemed unresponsive (step 304), the system manager 108 attempts to determine the status of a connection of the system manager to the client by, for example, using a ping utility to transmit a ping packet to the client and wait for a response at step 312. If the client responds (step 316), the system manager 108 directs the client to shutdown and restart at step 318 in an attempt to reestablish a proper operation of the client. If there is no response from the client (step 316), the system manager 108 generally has no mechanism to direct the client to shut itself down and restart. Therefore, in one embodiment, the system manager 108 contacts the PDU 112 (FIG. 1) by, for example, transmitting a ping packet to determine if the PDU 112 can be reached. If the PDU 112 responds, the system manager 108 directs the PDU 112 to cycle power to the client, causing the client to restart.

However, if neither the client or the PDU 112 can be contacted via a connection verification utility such as the ping utility, the system manager 308 is adapted to perform one or more diagnostic processes, such as trace routing, pinging other networked components, and/or compile a report for review by the administrator.

Figure 4:
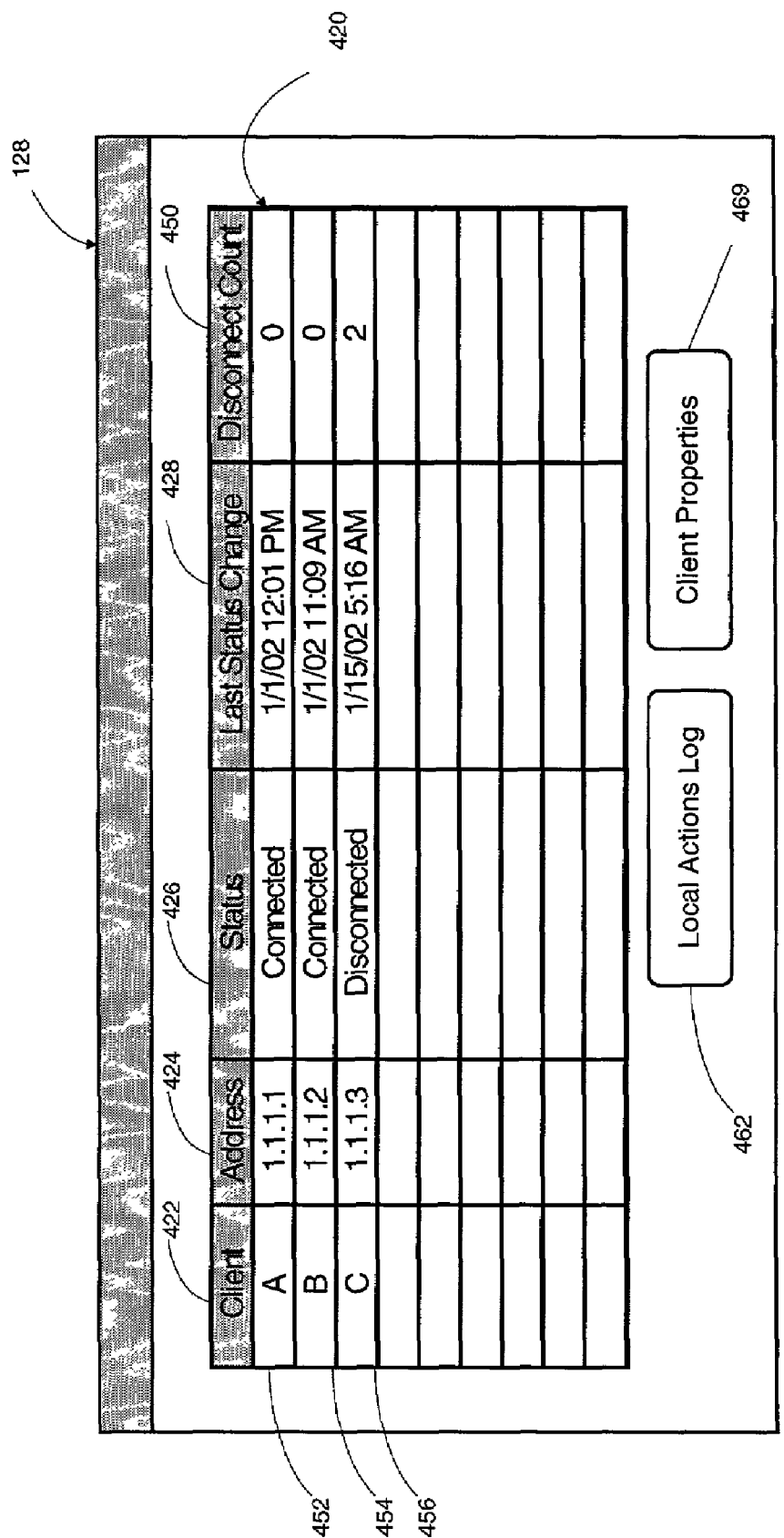
FIG. 4 is a block diagram illustrating an exemplary implementation of a graphical user interface for remote administration of a network of clients in accordance with at least one embodiment of the present invention.
Figure 5:
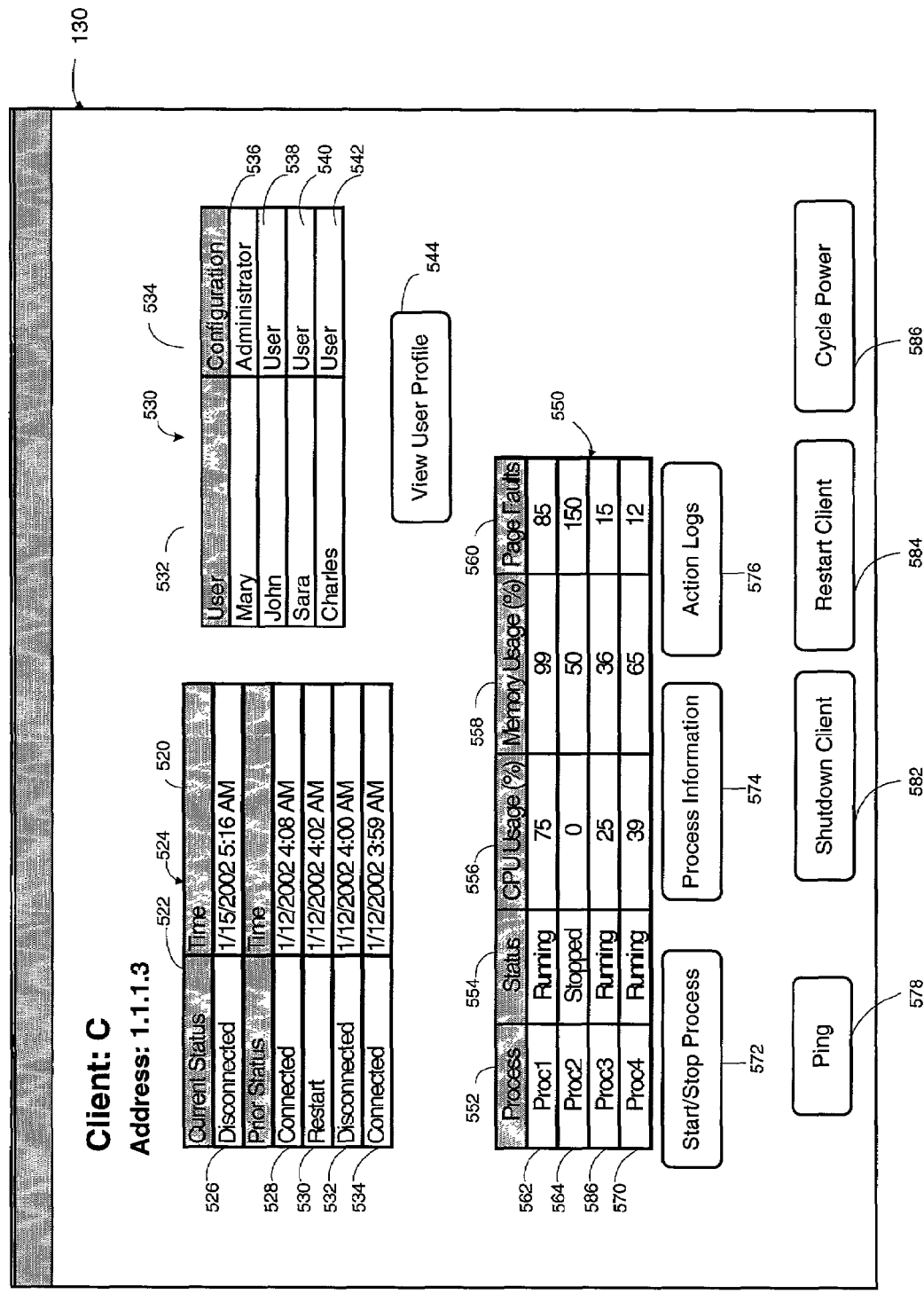
FIG. 5 is a block diagram illustrating an exemplary implementation of a graphical user interface for remote administration of a client in accordance with at least one embodiment of the present invention.

Referring now to FIGS. 4 and 5, exemplary graphical user interfaces (GUIs) 128 and 130 are illustrated in accordance with at least one embodiment of the present invention. As discussed above, in one embodiment, the system manager 108 is adapted to generate and display a graphical user interface 128 having information related to the overall status of the clients 102–106 (FIG. 1). In the illustrated embodiment, the GUI 128 includes a client status field 420 having a user-selectable client entry 452–456, each corresponding to one of clients 102–106. Each client entry can include a client identifier field 422 to identify the client (e.g., by name A, B, and C) and a status field 426 to identify a status of the client, such as connected, disconnected, restarted, and the like. Likewise, the client entry can include an address field 424 to identify the network address of the client, a disconnect count field 450 to identify the number of disconnections the client has experienced, and a status change field to identify when the status of the client last changed. Likewise, the GUI 128 can include a local action object 462 (e.g., a user-selectable button) that displays a log of the actions performed on the client when selected, shutting down the client, restarting the client management module program, shutting down a particular process, and the like. The GUI 128 also can include a client properties object 464 adapted to direct, when selected, the system manager 108 to display the GUI 128 associated with a client selected from one of the client entries 452–456.

As discussed above, the system manager 108, in one embodiment, is adapted to display one or more GUIs 130 having information regarding the properties and the operation of a selected client. In the exemplary embodiment illustrated in FIG. 5, the GUI 130 includes a process status field 550 having process entries 562–570 each corresponding to a process of the client monitored by the client management module. The process entry can include a process identifier field 552 to identify the associated process, a status field 554 to indicate the status of the process (e.g., running, stopped, restarted). Likewise the status field 554 can be used to indicate if the process has exceeded a system resource consumption threshold. For example, if the status field 554 is green in color, the process is within the threshold and if the status field 554 is red in color, the process has exceeded the threshold. The process status field 550 can also include one or more system resource consumption fields 556–558 to identify the system resource consumptions of the process. The values of the fields 556–558 can be displayed in absolute terms or in terms relative to the corresponding threshold such as a percentage of the threshold value or as a certain value class rather than a discrete numerical value. Additionally, the process status field 550 can include one or more threshold fields (not shown) identifying the threshold values for the corresponding system resource consumption fields 556–558.

Additionally, in at least one embodiment, the GUI 130 includes a process operation object 572 being adapted to start or stop a selected process at the client when selected by the user. For example, the user, noting that the procedure Proc1 (entry 562) is close to exceeding its memory usage threshold can select the entry 562 and then select the process operation object 572 to shutdown the process Proc1. Conversely, the procedure Proc2 has stopped (as judged by the status field 554). Accordingly, the user can select the entry 564 and then the process operation object 572 to restart the procedure Proc2. The GUI 130 also can include a process information object 574 adapted to display information associated with a selected process.

The GUI 130 also can include at least one client action object, such as a shutdown object 582 adapted to direct, when selected, the client to shutdown, a restart object 584 adapted to direct, when selected, the client to restart, a cycle power object 586 adapted to direct the PDU 112 to cycle power to the client when selected, and a ping object 578 adapted to direct, when selected, the system manager 108 to determine the status of the connection to the client using, for example, the ping utility.

In addition to the status process field 550, the GUI 130 can include a user field 530 having selectable user entries 536–542 associated with each user of the client. The user entries can include a user identification field 532 to identify the user and a configuration field 534 identifying the access status of the user. Additionally, a profile display object 544 can be utilized to display the properties of a selected user, such as preferences regarding the action response of the client management module, etc.

The GUI 130 also can include a status history field 524 for identifying the current status of the client (current status entry 526) as well as a history of the prior statuses of the client (history entries 528–534), both having a status field 522 to identify the status as of the change and a time/date field 520 to identify the time and/or the date of the corresponding change in status.

Referring now to FIG. 6, an exemplary implementation of the GUI 132 is illustrated in accordance with at least one embodiment of the present invention. As noted above, the GUI 132 may be used at either the client or the system monitor to manage and configure the fuzzy logic evaluation parameters associated with a process at a client. For example, an administrator can select the process information object 574 of the GUI 130 (FIG. 5) to direct the system manager 108 to display the GUI 132. The administrator may then interact with the GUI 132. Alternatively, a user at the client can select, for example, an icon in the GUI of the operating system to launch the GUI 132.

In the illustrated embodiment, the GUI 132 includes a fuzzy set graphic 620, a fuzzy logic field 650, a modify object 642, a cancel object 640, a resource field 670, and a select resource object 672. The resource field 670, in one embodiment, includes entries 674, 676 representative of one or more system resources evaluated using fuzzy logic. For example, as illustrated, entry 674 represents the rate-of-change in memory usage (MUD) and entry 676 represents the rate-of-change in CPU usage (CUD). The user, in one embodiment, may select one of the entries 674, 676 to modify the resource's associated fuzzy logic parameters using, for example, the select resource object 672. The fuzzy set graphic 620, in one embodiment, includes a graphic representative of the relations of the fuzzy subsets (i.e., a low, medium and high fuzzy subset) associated with the selected resource. The fuzzy logic field 650, in one embodiment, includes one or more fuzzy subset entries 662–666 having an identifier field 652 for displaying an identifier representative of the corresponding fuzzy subset, a start subset field 654 for displaying a value of the start of the corresponding subset, a stop subset field 654 for displaying a value of the stop of the corresponding subset, and a cut field 658 for displaying an value wherein the fuzzy subset begins to increase or decrease in value (based on whether it is a low, medium, or high fuzzy subset). For example, in the exemplary illustration, the low fuzzy set has a value of 1 starting at 0 and continuing to 0.3, wherein it linearly decreases to a value of 0 at 0.45.

In one embodiment, the user can manipulate the values of the fields of the entries 662–666 to change the corresponding properties of the fuzzy subsets. Alternatively, in one embodiment, the user can manipulate the fuzzy logic graphic 620 by, for example, clicking on the lines with a pointer and changing the line's position to change the properties of the fuzzy subset. Furthermore, in one embodiment, the entries 662–666 can include an equation field 660 whereby a user can enter an equation or expression representative of the properties of the corresponding fuzzy subset.

After a user has made any desired modifications, the user may select the modify object 642 to direct the system manager 108 (if the GUI is displayed at the system manager 108) to send a signal to the client representative of the desired changes to the parameters of the fuzzy logic evaluation associated with the monitored system resource consumption. If the GUI 132 is displayed at the client, the selection of the modify object 642 can direct the client to make the modifications directly. Conversely, the cancel object 640, when selected, can cancel or clear any modifications made by the user. Although an exemplary implementation of the GUI 132 has been illustrated, the GUI 132 can include additional or alternate entry and display fields useful in the modification of one or more parameters utilized by a fuzzy logic evaluation of a selected system resource consumption.

As described above, FIG. 1 illustrates an exemplary implementation of the invention. Further, FIGS. 2A–6 illustrate exemplary algorithms and graphical user interfaces in accordance with at least one embodiment of the present invention. The hardware portions of the system manager (FIG. 1) may be in the form of a "processing device," such as a general purpose computer, for example. As used herein, the term "processing device" is to be understood to include at least one processor that uses at least one memory. The at least one memory stores a set of instructions. The instructions may be either permanently or temporarily stored in the memory or memories of the processing device. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The processing device typically executes the instructions that are stored in the memory or memories to process data. This processing of data may be in response to commands by a user or users of the processing device, in response to previous processing, in response to a request by another processing device and/or any other input, for example.

The processing device used to implement the invention may be a general purpose computer. However, the processing device described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

As described above, a set of instructions may be used in the implementation of various embodiments of the present invention, such as the algorithms of FIGS. 2A, 2B, and 3, or the graphical user interfaces of FIGS. 4–6. The set of instructions may be in the form of a program or software. The software may be in the form of, for example, system software or application software. The software might also be in the form of a collection of separate programs, a program module within a larger program, or a portion of a program module. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing device as it processes a set of instructions and/or provide the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some embodiments of the system and method of the invention, it is not necessary that a human user actually interact with a user interface used by the processing device of the invention. Rather, it is contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

Other embodiments, uses, and advantages of the present invention will be apparent to those skilled in the art from consideration of the specification and practice of the invention disclosed herein. The figures and the specification should be considered exemplary only, and the scope of the present invention is accordingly intended to be limited only by the following claims and equivalents thereof.

What is claimed is:

1. In a distributed system having at least one system manager in bi-directional communication with at least one client performing a plurality of processes, a method for monitoring a subset of the plurality of processes comprising the steps of:

detecting a loss of supervisory control by the system manager over the processes at the client, including determining a status of a first process of the subset;

attempting by the client to restart the first process in the event the status indicates the first process is inoperative; and resetting the client by cycling power thereto in the event the status of the first process is operative.

2. The method as in claim 1, further comprising the steps of:

determining the status of the first process subsequent to the attempted restarting of the first process;

attempting to restart the first process a second time when the status indicates the first process remains inoperative.

3. The method as in claim 1, wherein the steps of determining the status of the first process and attempting to restart the first process are repeated for up to a predetermined number of iterations until the status of the first process indicates the first process is operative.

4. The method as in claim 3, further comprising the step of resetting the client when the status of the first process continues to indicate the first process is inoperative after attempting to restart the first process for the predetermined number of iterations.

5. The method as in claim 1, further comprising the steps of:
   determining a status of a second process of the subset; and
   attempting to restart the second process when the status of the second process indicates the second process is inoperative.

6. In a distributed system having at least one system manager in bi-directional communication with at least one client performing a plurality of processes, a method for monitoring a subset of a plurality of processes at the client, the method comprising the steps of:
   determining at least one system resource consumption by a first process of the subset;
   performing a fuzzy logic evaluation of the at least one system resource consumption to determine a first action response to be performed by the client in response to the system resource consumption by the first process, the first action response including at least one action; and
   performing, at the client, the at least one action of the first action response; and
   wherein the step of performing the fuzzy logic evaluation includes the steps of:
   determining at least one fuzzy logic truth value associated with the at least one system resource consumption;
   evaluating at least one fuzzy logic rule using the at least one fuzzy logic truth value to determine a fuzzy logic solution;
   defuzzifying the fuzzy logic solution to obtain an action response value; and
   determining the first action response based on the action response value.

7. The method of claim 6, wherein the at least one system resource consumption by the first process is a central processing unit (CPU) usage, a memory usage, a rate-of-change in memory usage, a peak memory usage, a virtual memory size, a number of page faults, a rate-of-change in a number of page faults, a paged pool, a non-paged pool, a handle count, a thread count, a number of user objects, a graphical display interface object count, an input/output (I/O) read count, I/O read bytes, an I/O write count, or I/O write bytes.

8. The method of claim 6, wherein the at least one action is resetting the client, shutting down the first process, starting the first process, terminating the first process, displaying a query box for observation by an administrator/user, sending a page to an administrator's pager, sending a facsimile to a fax machine, sending an email to an administrator, or sending a voice message to a mobile phone number.

9. The method of claim 6, wherein the first action response includes at least two iterations of an action.

10. The method of claim 6, wherein the step of determining the first action response includes selecting the action response from a plurality of action responses, each of the plurality of action responses having a different value range, and wherein a value range of the selected first action response includes the action response value.

11. The method of claim 6, further comprising the steps of:
    determining at least one system resource consumption by a second process of the subset;
    performing a fuzzy logic evaluation of the at least one system resource consumption by the second process to determine a second action response to be performed by the client in response to the system resource consumption by the second process, the second action response including at least one action; and
    performing, at the client, the at least one action of the second action response.

12. In a distributed system having a system manager in bi-directional communication with at least one client, a method for monitoring a communications link between the system manager and a client, the method comprising the steps of:
    detecting a failure in the communications link between the system manager and the client management module;
    determining an operative status of a client management module at the client;
    directing the client to restart the client management module when the operative status indicates the client management module is inoperative; and
    resetting the client when the status indicates the client management module is operative.

13. The method of claim 12, wherein the step of determining the operative status is performed by attempting to contact the client management module.

14. The method of claim 13, further comprising the steps of:
    determining a status of a connection of the system manager to the client over the communications link; and
    restarting the client when the status indicates that the connection to the client is valid.

15. The method of claim 14, further comprising the steps of:
    establishing a communication between the system manager and a power distribution unit adapted to provide power to the client;
    and wherein the step of restarting the client includes the step of directing by the system manager the power distribution unit to cycle power to the client when the status indicates that the connection to the client is valid.

16. The method of claim 12, wherein the step of detecting the failure includes receiving a signal from a separate component in communication with the client, wherein the signal represents a communications failure between the separate component and the client.

17. In a distributed system having a system manager in bi-directional communication with at least one client having a client management module to monitor at least one process performed by the client, a graphical user interface for displaying at least one property of the client management module process at the system manager comprising:
    a process status field having a user-selectable process entry for each of the at least one process, each process status field including:
    a process identifier field representing an associated process;
    a status field representing an operative status of the associated process; and
    at least one resource consumption field representing a consumption by the associated process of an associated system resource;

a process operation object adapted to direct, when selected by a user, the client to restart a process associated with a process status field selected by the user when the associated process is inoperative and to stop the associated process when the associated process is operative; and at least one client action object adapted to direct, when selected by a user, the client to perform an associated action.

18. The graphical user interface of claim 17, wherein the at least one client action object includes one of a group consisting of: a shutdown object adapted to direct, when selected by a user, the client to shutdown the client; a restart object adapted to direct, when selected by a user, the client to restart; a cycle power object adapted to direct, when selected by a user, a power distribution unit to cycle power to the client; and a ping object adapted to direct, when selected by a user, the system manager to determine a status of a connection of the system manager to the client.

19. The graphical user interface of claim 17, further comprising a client status field being adapted to display a status history of the client.

20. The graphical user interface of claim 17, further comprising:

a user field having a user-selectable user entry associated for each of at least one user of the client; and a profile display object adapted to direct, when selected by a user, the client to display a profile of a user associated with a selected user entry.

21. In a distributed system having a system manager in bi-directional communication with at least one client having a client management module to monitor at least one process performed by the client, a graphical user interface for managing at least one property of the client management module at the system manager comprising:

a fuzzy logic field being adapted to receive input from a user, the input being representative of a desired change in at least one parameter of a fuzzy logic evaluation used by the client management module to manage one or more processes of the client; and a modify object adapted to direct the system manager to transmit a signal representative of the desired change to the client management module for implementation at the client management module.

22. A system comprising:

a first client being adapted to perform a plurality of processes, the first client including a client management module adapted to:

determine at least one system resource consumption by a first process of plurality of processes;

perform a fuzzy logic evaluation of the at least one system resource consumption to determine a first action response to be performed by the first client in response to the system resource consumption by the first process, the first action response including at least one action;

perform the at least one action of the first action response; and a system manager in communication with the first client and being adapted to direct the first client to modify at least one parameter of the fuzzy logic evaluation used by the first client.

23. The system of claim 22, wherein the system manager is further adapted to receive input from a user, the input being representative of a desired modification of the at least one parameter of the fuzzy logic evaluation performed by the first client.

24. The system of claim 22, wherein the system manager is further adapted to:

monitor a status of the client management module of the first client;

direct the first client to start the client management module when the status of the client management module indicates that the client management module is not activated at the first client; and direct the first client to restart when the status of the client management module indicates that the client management module is inoperative.

25. The system of claim 24, wherein the system manager is further adapted to:

monitor a status of a connection between the first client and the system manager; and direct the first client to restart when the status of the connection indicates that the connection is valid.

26. The system of claim 25, further including a power distribution unit being adapted to provide power to the first client.

27. The system of claim 26, wherein the system manager is further adapted to direct the power distribution unit to cycle power to the first client when the status of the connection indicates that the connection is invalid.

28. The system of claim 25, further comprising an external component in communication with the first client and the system manager and being adapted to provide a signal to the system manager when a failed connection between the external component and the first client is detected.

29. The system of claim 25, wherein the system manager is further adapted to provide for display a user a graphical user interface having an indicator of a connection status of the first client based at least in part on the notice from the first client.

30. The system of claim 25, wherein the system manager is further adapted to provide for display to a user a graphical user interface associated with the first client and having:

a process status field having a user-selectable process entry for each process of the subset of processes, each process status field including:

a process identifier field representing an associated process;

a status field representing an operative status of the associated process; and at least one resource consumption field representing a consumption by the associated process of an associated system resource of the first client;

a process operation object adapted to direct, when selected by a user, the first client to restart a process associated with a selected process status field when the associated process is inoperative and to stop the associated process when the associated process is operative; and at least one client action object adapted to direct, when selected by a user, the first client to perform an associated action.

31. The system of claim 30, wherein the at least one client action object includes one of a group consisting of: a shutdown object adapted to direct, when selected by a user, the first client to shutdown; a restart object adapted to direct, when selected by a user, the first client to restart; a cycle power object adapted to direct, when selected by a user, a power distribution unit to cycle power to the first client; and a ping object adapted to direct, when selected by a user, the system manager to determine a status of a connection of the system manager to the first client.

32. The system of claim 22, wherein the system manager is further adapted to provide for display to a user a graphical user interface associated with the first client and having:
- a fuzzy logic field being adapted to receive input from a user, the input being representative of a desired change in at least one parameter of a fuzzy logic evaluation used by the client management module to manage one or more processes of the client; and
- a process operation object adapted to direct the system manager to transmit a signal representative of the desired change to the client management module for implementation at the client management module.

33. The system of claim 22, further comprising a second client being adapted to perform a plurality of processes, the second client including a client management module adapted to:
- determine at least one system resource consumption by a first process of plurality of processes performed by the second client;
- perform a fuzzy logic evaluation of the at least one system resource consumption by the first process to determine a first action response to be performed by the second client in response to the system resource consumption by the first process, the second action response including at least one action; and
- perform the at least one action of the second action response; and
- wherein the system manager is further adapted to direct the second client to modify at least one parameter of the fuzzy logic evaluation used by the second client.

34. The system of claim 22, wherein a system resource consumed by the first process is a central processing unit (CPU) usage, a memory usage, a rate-of-change in memory usage, a peak memory usage, a virtual memory size, a number of page faults, a rate-of-change in a number of page faults, a paged pool, a non-paged pool, a handle count, a thread count, a number of user objects, a graphical display interface object count, an input/output (I/O) read count, I/O read bytes, an I/O write count, or I/O write bytes.

35. The system of claim 22, wherein the action is resetting the first client, shutting down the first process, starting the first process, terminating the first process, displaying a query box for observation by an administrator/user, sending a page to an administrator's pager, sending a facsimile to a fax machine, sending an email to an administrator, or sending a voice message to a mobile phone number.

36. The system of claim 22, wherein the first client is further adapted to:
- determine at least one system resource consumption by a second process of the subset;
- perform a fuzzy logic evaluation of the at least one system resource consumption by the second process to determine a second action response to be performed by the first client in response to the system resource consumption by the second process, the second action response including at least one action; and
- perform the at least one action of the second action response.

37. A computer readable medium being adapted to manipulate a processor to:
- determine at least one system resource consumption by a first process of a subset of processes performed by a client;
- perform a fuzzy logic evaluation of the at least one system resource consumption to determine a first action response to be performed by the client in response to the system resource consumption by the first process, the first action response including at least one action; and
- perform the at least one action of the first action response; and
- wherein the executable instructions being adapted to manipulate the processor to perform the fuzzy logic evaluation include executable instructions being adapted to;
- determine at least one fuzzy logic truth value associated with the at least one system resource consumption;
- evaluate at least one fuzzy logic rule using the at least one fuzzy logic truth value to determine a fuzzy logic solution;
- defuzzify the fuzzy logic solution to obtain an action response value; and
- determine the first action response based on the action response value.

38. The computer readable medium of claim 37, wherein the at least one system resource consumed by the first process is a central processing unit (CPU) usage, a memory usage, a rate-of-change in memory usage, a peak memory usage, a virtual memory size, a number of page faults, a rate-of-change in a number of page faults, a paged pool, a non-paged pool, a handle count, a thread count, a number of user objects, a graphical display interface object count, an input/output (I/O) read count, I/O read bytes, an I/O write count, or I/O write bytes.

39. The computer readable medium of claim 37, wherein the at least one action is resetting the client, shutting down the first process, starting the first process, terminating the first process, displaying a query box for observation by an administrator/user, sending a page to an administrator's pager, sending a facsimile to a fax machine, sending an email to an administrator, or sending a voice message to a mobile phone number.

40. The computer readable medium of claim 37, wherein the first action response includes at least two iterations of an action.

41. The computer readable medium of claim 37, wherein the executable instructions being adapted to manipulate the processor to determine the first action response includes executable instructions being adapted to manipulate the processor to select the action response from a plurality of action responses, each of the plurality of action responses having a different value range, and wherein a value range of the selected first action response includes the action response value.

* * * * *